United States Patent
Aaron, Jr. et al.

[11] Patent Number: 5,938,292
[45] Date of Patent: Aug. 17, 1999

[54] AUTOMOTIVE WHEEL BEARING SPINDLE PILOT WITH REDUCED CORROSION CONTACT INTERFACE

[75] Inventors: Danny Aaron, Jr., Sandusky; Edward Dupakoski, Oberlin; Richard Albert Wollenberg, Sandusky, all of Ohio

[73] Assignee: General Motors Corporation, Detroit, Mich.

[21] Appl. No.: 08/925,946

[22] Filed: Sep. 8, 1997

[51] Int. Cl.$^6$ ....................................................... B60B 27/00
[52] U.S. Cl. ..................... 301/105.1; 301/35.63; 301/111
[58] Field of Search ................... 301/105.1, 111, 301/35.62, 35.63, 124.1, 6.91, 131

[56] References Cited

U.S. PATENT DOCUMENTS

| | | | |
|---|---|---|---|
| 1,876,393 | 9/1932 | Booth . | |
| 2,235,457 | 3/1941 | Lorimor | 301/111 X |
| 2,271,849 | 2/1942 | Wallace | 301/111 X |
| 4,699,431 | 10/1987 | Daberkoe | 301/105.1 X |
| 5,080,500 | 1/1992 | Hilby et al. | 384/448 |

*Primary Examiner*—Russell D. Stormer
*Attorney, Agent, or Firm*—Patrick M. Griffin

[57] ABSTRACT

The normally smooth and uninterrupted cylindrical wheel and brake drum pilot surface of a wheel bearing spindle is process in a novel manner designed to reduce the potential for water induced corrosion at the contact interface. A low lead angle, square bottomed spiral cut reduces the pilot surface area considerably and provides water drainage channels radially inset from the remainder of the surface area. There is considerably less area in the contact interface to corrode, and the remaining area has water well drained away from it.

3 Claims, 5 Drawing Sheets

5,938,292

AUTOMOTIVE WHEEL BEARING SPINDLE PILOT WITH REDUCED CORROSION CONTACT INTERFACE

TECHNICAL FIELD

This invention relates generally to automotive wheel bearing spindles, and specifically to a novel pilot surface configuration for a spindle that provides improved attachment and removal of a wheel or similar component, by reducing the contact interface surface area and the potential for interface corrosion.

BACKGROUND OF THE INVENTION

Known wheel bearings of the type shown in FIGS. 1 and 2, and indicated generally at 10, have a stationary outer hub 12, which is secured to a non illustrated vehicle suspension, and a rotatable spindle, indicated generally at 14, with a central axis A shown by the dotted line. Spindle 14 carries two components that rotate with it, the vehicle wheel 16 and a brake drum 18. Brake drum 18 is mounted over spindle 14 through an open, flat circular hub 20, which has an annular inner edge 22 with a predetermined axial thickness T of approximately 7 to 8 mm. When the brake drum hub 20 is installed to spindle 14, its inner edge 22 is pushed axially over and guided along a cylindrical pilot surface 24, relative to which it has a very small radial clearance, as best seen in FIG. 2. A concentric, flat annular wheel flange 26 radiates outwardly from the pilot 24, perpendicular thereto, with a flat outer surface 28 against which the brake drum hub 20 is abutted. The brake drum hub 20 is firmly sandwiched between the flange surface 28 and the wheel 16 itself, which is bolted onto conventional studs 30 with non illustrated, conventional lug nuts. Similarly to brake drum 18, wheel 16 has a flat hub 32 with an annular inner edge 34 having a diameter and axial thickness similar to the brake drum hub inner edge 22. The wheel hub inner edge 34 guides over the pilot surface 24 in similar fashion with a comparable small radial clearance. The wheel hub 32 clamps the brake drum hub 20 against the flange surface 28 when the lug nuts are tightened down onto studs 30. After installation, the two hubs 20 and 32 are maintained concentric to axis A by the studs 30, so the pilot surface 24 with its close radial clearance is needed basically for guidance during installation (and removal) of the wheel 16 and brake drum 18, as its name implies, not for post installation concentricity support. However, the close radial clearance at the contact interface between the spindle pilot surface 24 and the two hub inner annular edges 22 and 34 remains after installation. During vehicle operation, that contact interface and its small radial clearance is exposed to water. The spindle 14 and brake drum 18 are invariably steel, and subject to corrosion or rusting, and the wheel 16 may be steel or aluminum, also subject to corrosion. After the wheel 16 and brake drum 18 have been installed for a long period, the respective annular edges 22 and 34 can essentially weld themselves to the pilot surface 24 because of corrosion growth at the contact interface, especially in environments exposed to salt water. This can make it difficult to remove and reinstall the wheel 16 or drum 18 for servicing.

A typical method for reducing corrosion at the contact interface is to simply coat the pilot surface 24 with a non corrosive paint or other coating. In addition to the obvious cost, such a layer can itself be scraped off with even a few removals and reinstallations, after which it would be ineffective. Whether coated or uncoated, spindle pilot surfaces known to have been used in actual production are cylindrical and basically smooth and uninterrupted, although they may have a stepped diameter to accommodate different diameter wheel and drum edges. However, an issued U.S. Pat. No. 5,080,500 to Hilby et al, shows a dual diameter cylindrical wheel bearing spindle pilot surface that appears to have been cut with conventional threads, for an unexplained purpose. It may be that the threads were used to attach a non corrosive sleeve, to insulate the wheel and brake drum edges from the pilot surface. This seems most likely, since sharp edged threads would retard the motion of a close fitting component edge sliding directly onto and over them, and would be easily marred and damaged in the process. Furthermore, direct contact (or small radial clearance) between a sharp edged thread and the annular inner edge of a brake drum or wheel hub would not likely be conducive to water corrosion reduction, as will be described further below.

SUMMARY OF THE INVENTION

The subject invention provides a novel surface configuration for the pilot surface of a wheel bearing spindle which reduces both the effect of, and likelihood of, corrosion at the pilot contact interface.

In the preferred embodiment shown, the cylindrical pilot surface is cut with a square bottomed spiral of regular pitch, extending from the end of the spindle to the flat flange surface. The spiral creates, in effect, a regularly spaced series of square bottomed annular channels separated by a series of annular interstitial rings, the cylindrical outer surfaces of which are the remnants of the original, smooth pilot surface. The pitch and width of the spiral cut are set, relative to the predetermined axial thickness of the brake drum and wheel inner edges, so as to assure that the guided component inner edges are wider than a channel and adjacent ring pair.

When the brake drum and wheel are pushed axially over the spindle, their inner edges slide easily over the outer surfaces of the rings, without damage, since they are cylindrical on their outer surfaces, with the same diameter as the original pilot surface. The sliding edges do not catch on or drop into the narrower channels between the rings. Once the wheel and brake drum are abutted with and attached to the flange, their annular inner edges bridge at least one channel, and are supported by at least one or two rings, with a small radial clearance at the contact interface. There is less surface area to potentially corrode and bind at the interface, because of the inset channels, and any water that does enter the interface can easily drain away from the interface and into the channels, without significant capillary action to maintain it in the interface. Therefore, both the potential for corrosion and the amount of contact surface area for corrosion to affect are reduced. In addition, in the case of oppositely directed spirals on opposed spindles, a dynamic slinging action can be achieve to throw water forcibly out of the channels.

BRIEF DESCRIPTION OF THE DRAWINGS

These and other features will appear from the following written description, and from the drawings, in which.

DESCRIPTION OF THE PREFERRED EMBODIMENT

Figure 1:
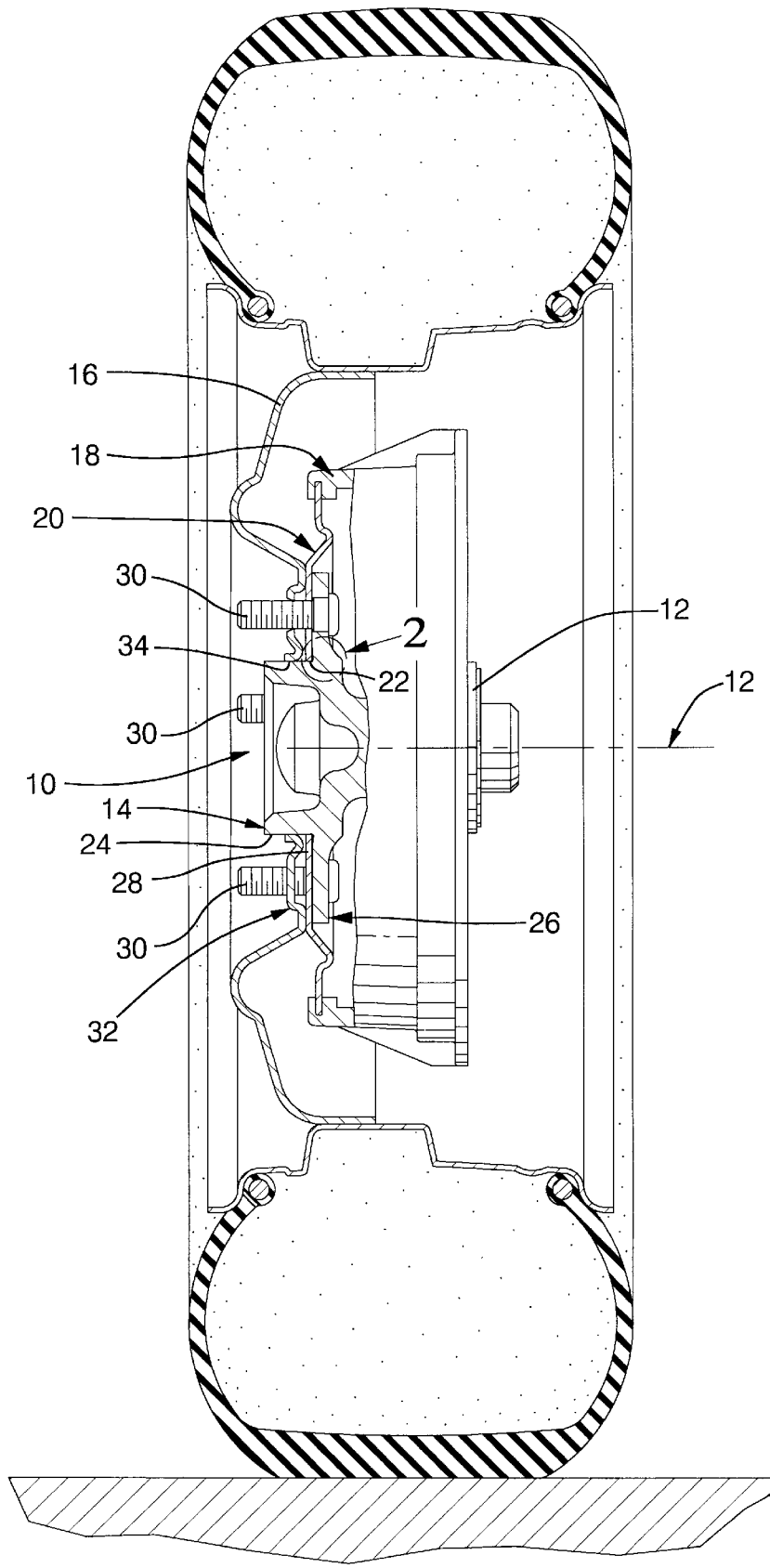
FIG. 1 shows a prior art wheel bearing spindle with attached brake drum and wheel.
Figure 2:
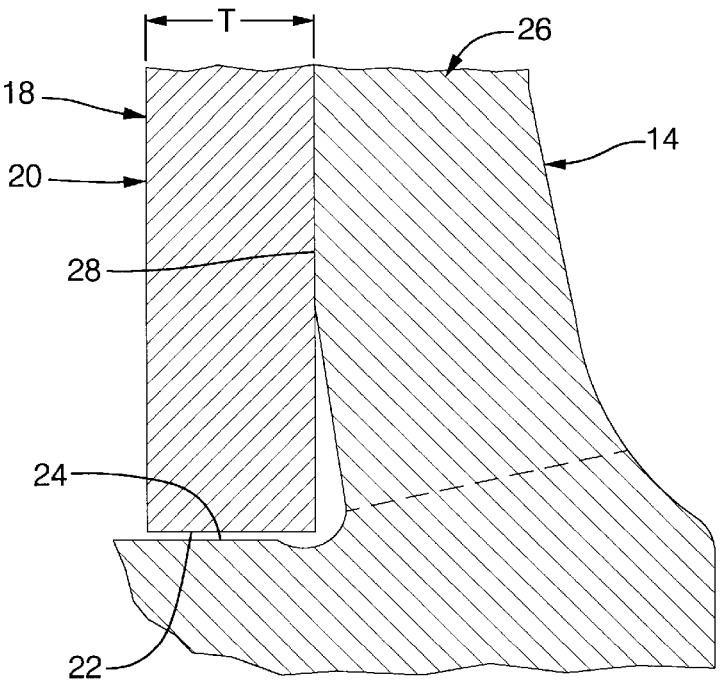
FIG. 2 shows an enlargement of the circled area of FIG. 1.
Figure 3:
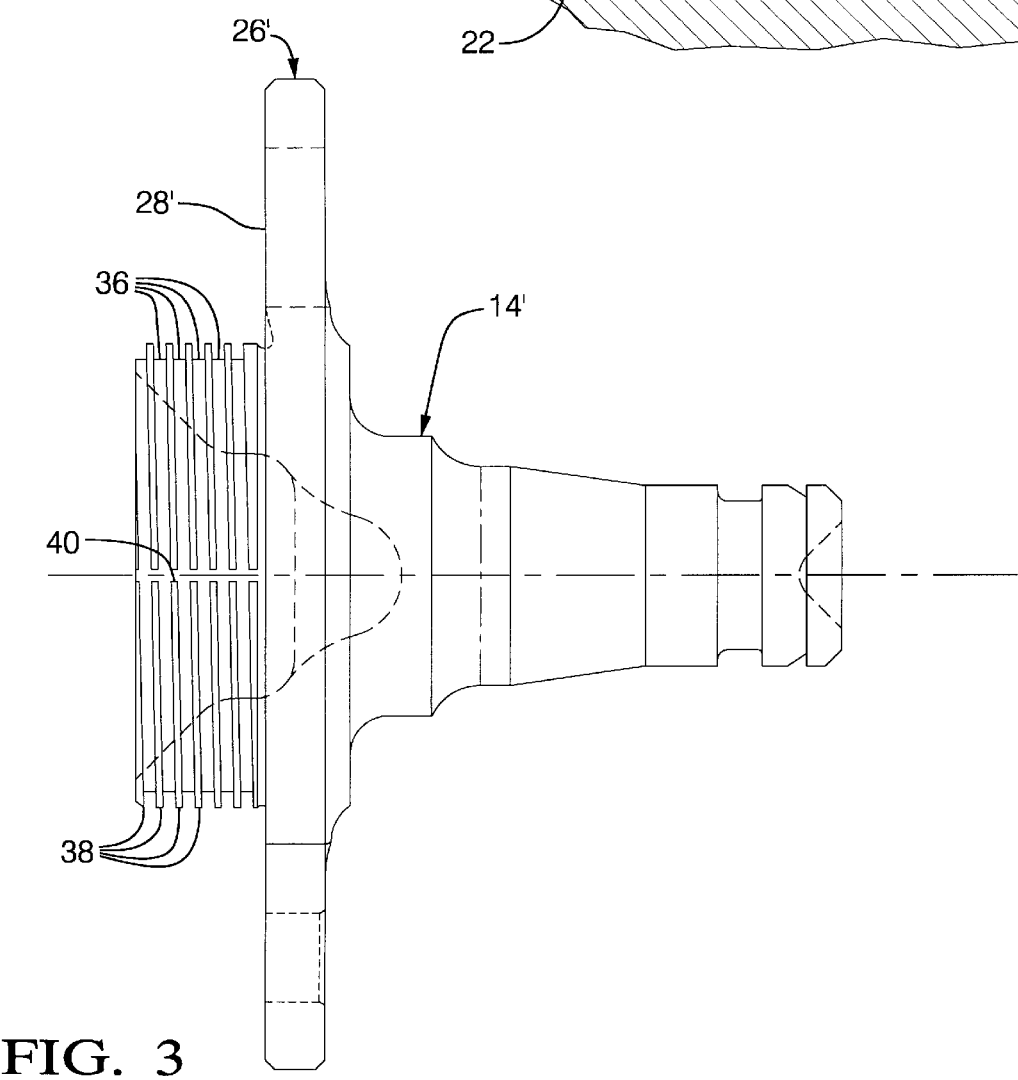
FIG. 3 shows a side view of a wheel spindle with a pilot surface processed according to the invention.

Referring first to FIG. 3, a spindle made according to the invention is indicated generally at 14', since it has the same basic material, shape, size and features as the spindle 14 described above, including the same flange 26' and flat flange surface 28'. Exactly the same wheel 16 and brake drum 18, with the same thickness ate the inner edges 22 and 34, would be installed, and attached with the same studs 30'. It would also have, at least originally, the same smooth cylindrical pilot surface 24, with the same diameter, approximately seventy mm, and same axial length, approximately twenty mm as shown. The pilot surface 24 is reshaped, however, by cutting a continuous spiral channel into it, all the way from the free end to the flange surface 28'. The spiral cut is not made with a conventional thread tap, since that would leave a conventional thread shaped, sharp at the crest and V shaped at the flanks. Instead, the spindle 14' is turned on a lathe and a carbide cutter is advanced axially at a rate designed to cut a spiral with a very shallow lead angle of only a few degrees. As viewed from the side in FIG. 3, a continuous spiral cut with a very shallow lead angle is effectively equivalent to an axially spaced series of annular channels 36 perpendicular to the axis A, separated by an equal number of interstitial annular rings 38. Stated differently, in terms of the advantages achieved by the invention, a series of distinct rings and channels would be just as effective as the continuous spiral, which does not serve any of the attachment functions that a continuous cut thread typically does. However, there is a processing advantage to the continuous spiral, in most cases, and one other advantage, as noted below.

Figure 4:
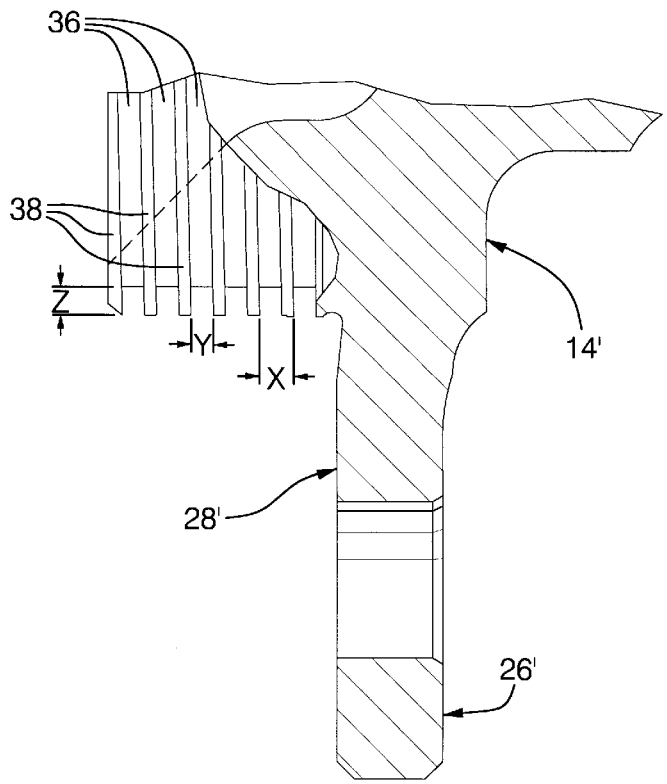
FIG. 4 shows an enlargement of a portion of FIG. 3.

Referring next to FIG. 4, the spiral is cut with a particular width and axial advance so as to create channels 36 and rings 38 that have a specific axial thickness in relation to the axial thickness of the two hub inner edges 22 and 34. As noted above, the axial thickness of the two hub annular inner edges 22 and 34 ranges between 7 and 8 mm, which can vary from case to case, and will be a predetermined quantity in any particular case. The total thickness of each adjacent pair of channel 36 and ring 38 together is designed to be less than the axial thickness of edge 22 and 34, and preferably to total only about half that thickness. In addition, it is preferable that the axial thickness of a ring 38 not be drastically less than an adjacent channel 36, so as to have substantial strength. As disclosed, the continuous spiral is cut two mm axially wide (and approximately two mm radially deep) with a constant axial advance of approximately three mm. This effectively creates a regularly axially spaced series of approximately seven square bottomed annular channels 36, each with an axial thickness X of two mm, and with a substantially equal radial depth Z of 2 mm. The channels 36 are separated by an equal number of rings 38 having an axial thickness X of one mm, and a height equal to the depth of the adjacent channel 36. The crests of the rings 38 are cylindrical and "flat" in cross section, being simply the remnants of the original pilot surface 24, and therefore of equal diameter and concentric to the original pilot surface 24. In addition, in the embodiment shown, one or more evenly angularly spaced axial notches 40 are cut across all the rings 38, opening all the channels 36 to one another. No paint or other coating is applied, although normal heat treat may be carried out as a last step, since there is no paint or coating to be damaged thereby.

Figure 5:
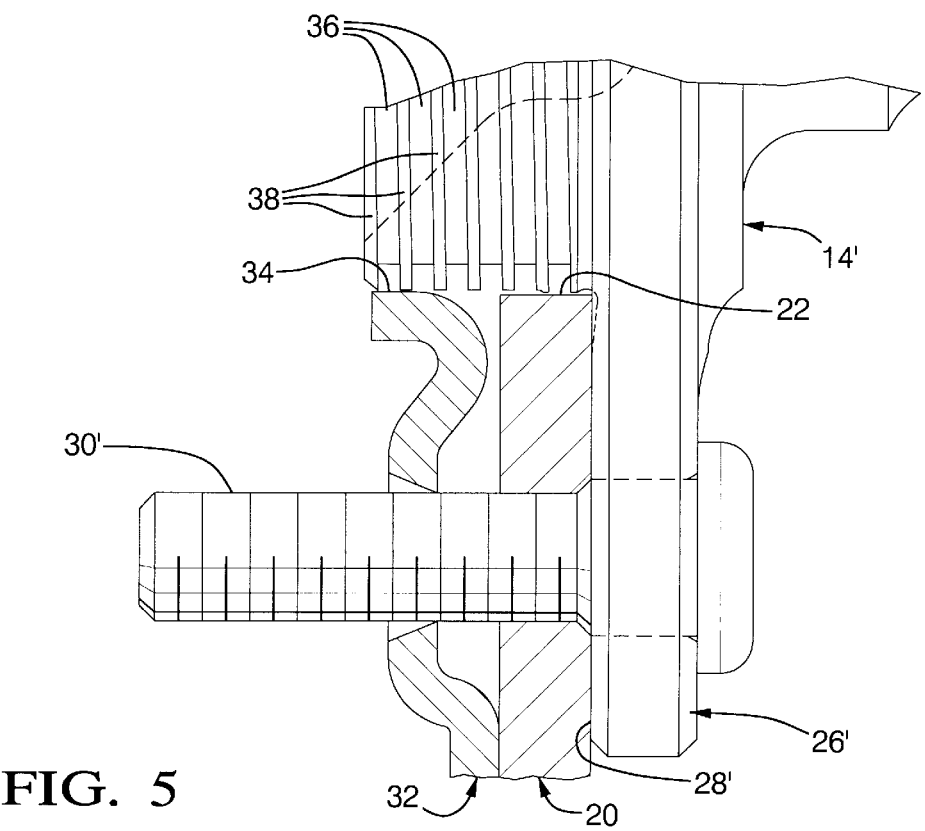
FIG. 5 shows the same portion of the wheel spindle as FIG. 4, and shows in addition the inner edges of the brake drum hub and wheel hub after installation.

Referring next to FIG. 5, the brake drum hub edge 22 and wheel hub edge 34 can be pushed axially onto and guided over the concentric outer surfaces of the rings 38, just as they would be installed over a conventional, smooth pilot surface. Because of the relative axial thickness relation of each channel 36-ring 38 adjacent pair as described above, the component hub edges 22 and 34 will not catch on a ring 38 or drop into in a channel 36. The "flat" outer surfaces of the rings 38 will not be damaged or marred, as sharp edged thread crests would be. The rings 38 are sufficiently comparable in axial thickness and radial height (one and two mm respectively) so as to be sufficiently strong to resist being bent sideways. During installation, some arc shaped portion of either edge 22 or 34 will typically be axially sliding across and "bridging" two or more such rings 38 at once, which can thereby provide the same continuous guiding support that a conventional, smooth pilot surface would. When the two hubs 20 and 32 are abutted to the flange surface 28' and bolted tight, their respective inner edges 22 and 34 will bear the same relationship to the crests of the rings 38 as they would have to the original pilot surface 24.

Figure 7:
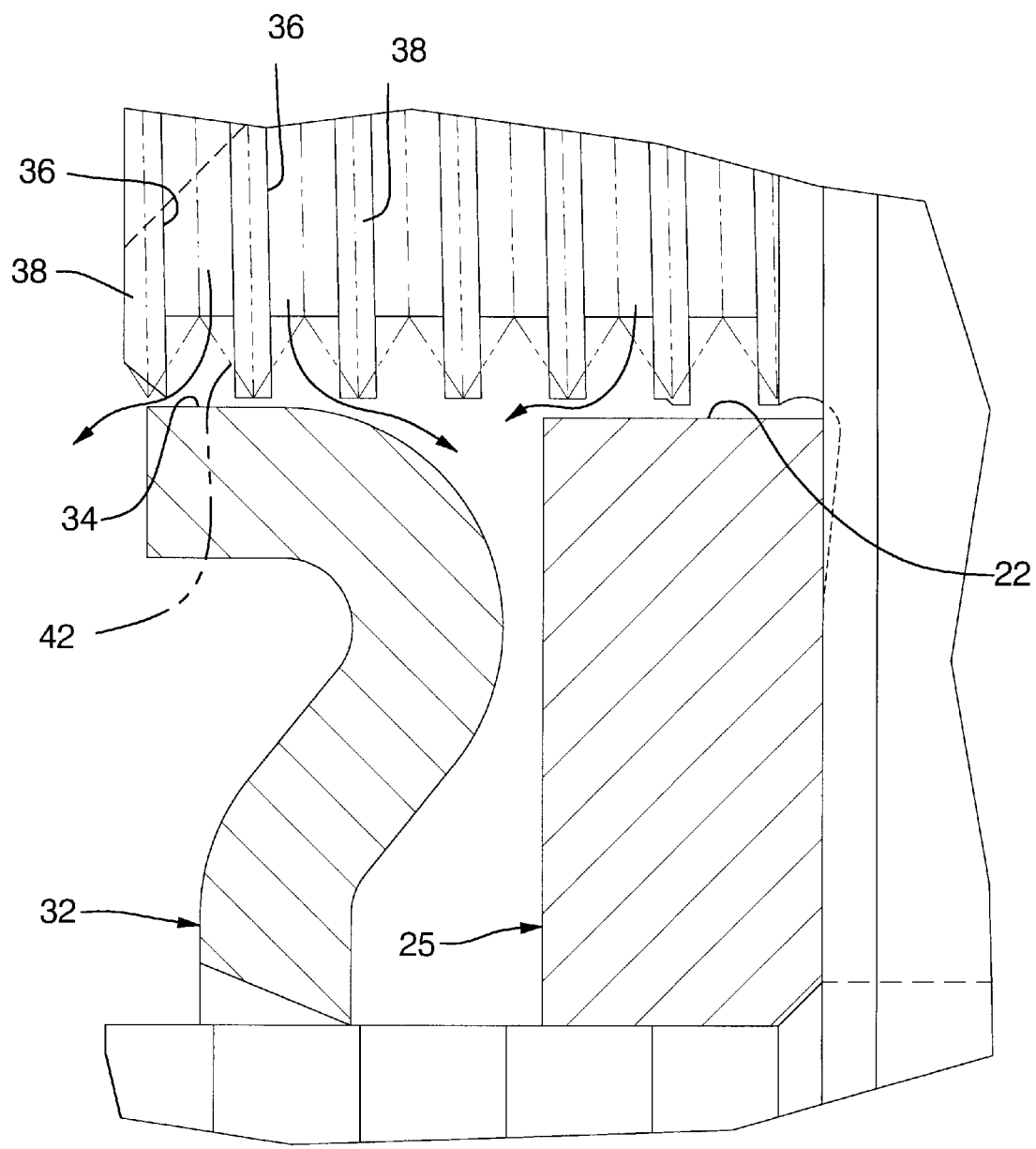
FIG. 7 is an enlargement of the contact interfaces of FIG. 5, showing the drainage action, compared to the potential performance of a conventional thread shape, shown in dotted lines.

Referring next to FIG. 7, the relationship of the channels 36 and rings 38 to the edges 22 and 34 can be better seen. Each hub inner edge 22 and 34 is radially opposed to approximately three rings 38, bridging two channels 36. There may not be actual physical contact between the edges 22 and 34 and the outer surfaces of the rings 38, at least not all the way round, depending on how concentrically to the spindle axis A the studs 30' actually hold the hubs 20 and 32. A very slight radial clearance is indicated at the cross section shown. Regardless, the interface can still be referred to as a "contact interface" between the edges 22 and 34 and the outer surfaces of the rings 38. The radial clearance would be close enough to actual physical contact that water caused corrosion could quickly close up the gap and cause binding. Here, however, the remaining surface area of the pilot surface 24 left for such potential corrosive contact has been reduced by one half or more. Even if the corrosive potential of water contact were not reduced, the surface area that it can affect would be. In addition, the ability of water to reach and remain in at the radial contact interface is reduced. As shown by the arrows, water can easily gravity drain into the channels 36 and between channels 36, through any available radial clearance, to flow ultimately out and away from the contact interface. There would generally be radial clearance at some point circumferentially around the contact interface, as noted above, and the cross cut notch or notches 40 would aid such cross channel water drainage. Furthermore, the side walls of the rings 38 are effectively straight in cross section, not sloped, as would be the flanks of a conventional thread. (A hypothetical equivalent thread, being a conventionally cut thread of equal pitch to the flat bottomed spiral, is shown in dotted lines at 42 for comparison.) Consequently, at the contact interface between the outer surface of a ring 38 and the surface of the opposed edge 22 or 34, there is no triangular corner, with its "draw in" capillary action, as there would be with a sloped thread flank 42. Water would not be pulled into the interface, but allowed to drain. And, again, to the extent that it did not drain, the surface area where water could cause any corrosive binding is drastically reduced, but with no ill effect on part installation or removal.

Figure 6:
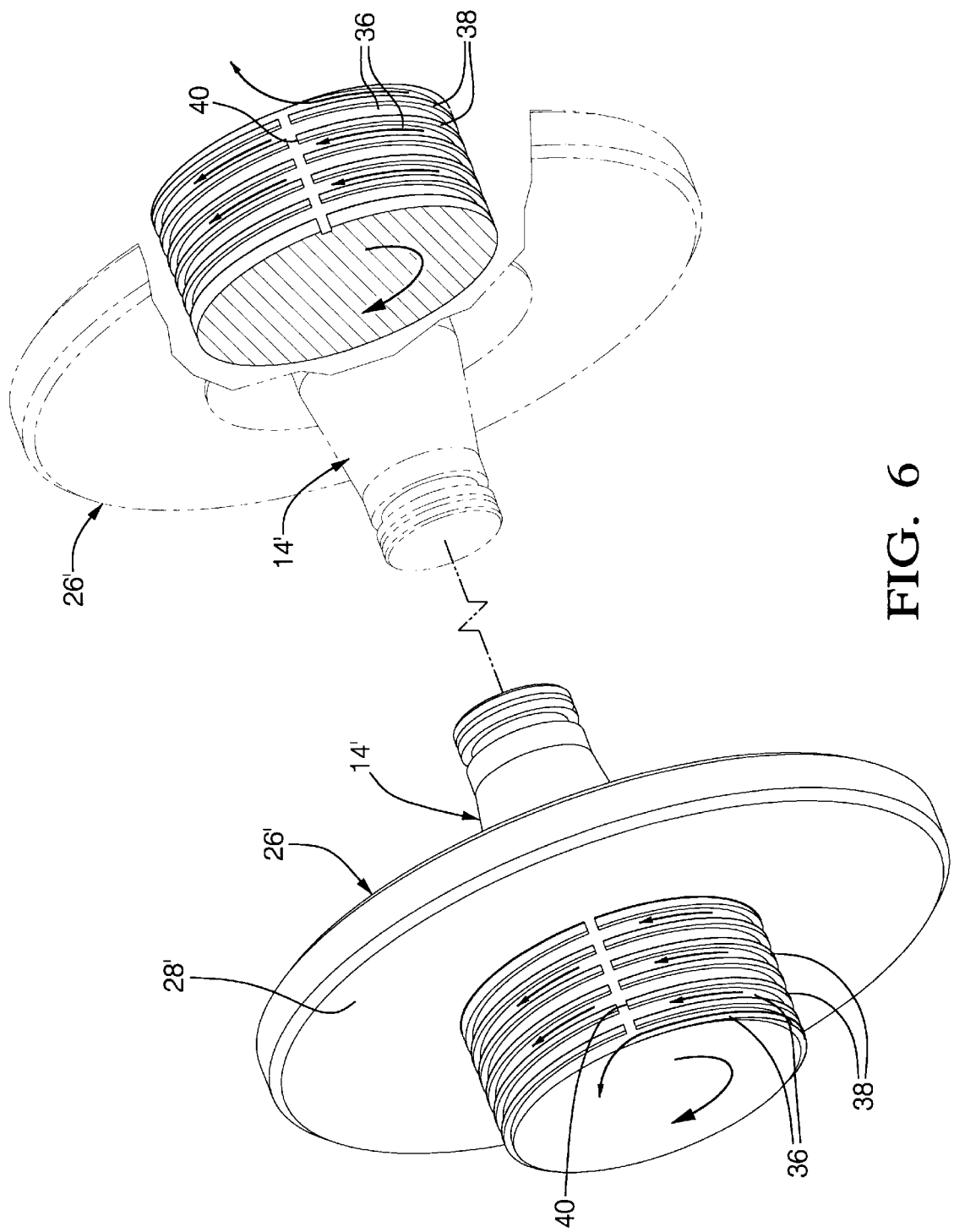
FIG. 6 is a schematic view of opposed pair of wheel spindles made according to the invention, showing the dynamic water slinging action.

Referring to FIG. 6, as noted above, there is one particular advantage of creating the channels 36 and rings 38 by means of a continuos spiral cut with a low lead angle. While a flat sided spiral cut would not function as an attaching thread, it can create a dynamic water slinging action, if its hand bears the proper relation to the direction of rotation of the spindle 14'. Each spindle 14' on each side of the car can be spiral cut with the proper relative hand so as to sling water axially out and away from the flange 26' when rotating. However, as far as the basic corrosion effect reduction and static drainage noted above, entirely separate and distinct channels 36 and rings 38 would work just as well. Cutting such distinct channels 36 would require repeatedly radially withdrawing, axially advancing, and radially plunging the cutter bit each time, which would not generally be practical when the same effect would be achieved with a shallow lead angle continuos cut. However, distinct channels (and interstitial rings) could conceivably be roll formed into the pilot surface 24 with a dedicated tool, speeding the operation and even strengthening the surface by cold forming. By making the total thickness of each ring-channel adjacent pair less than the thickness of the component edge to be guided and supported, it is assured that the component edge will be, when fully installed, radially opposed to at least one such channel-ring pair. When the axial thickness of the installed component's inner edge is sufficient, however, it is preferable that the channels and rings be more finely divided, with an adjacent ring-channel pair having a total axial thickness only about half or less of the supported component edge's axial thickness. This assures edge support across more than one such ring, and also assures a smooth, continuous axial sliding motion during part installation, as disclosed. Therefore, it will be understood that it is not intended to limit the invention to just the embodiment disclosed.

We claim:

1. In a corrosive material automotive wheel bearing spindle having a center axis of rotation, a cylindrical pilot surface exposed to water in use and concentric to said axis of rotation over which pilot surface is installed a component with an annular inner edge of predetermined axial thickness with a small radial clearance from said pilot surface, the improvement comprising;

a series of substantially annular, regularly axially spaced channels of rectangular cross section cut into said pilot surface said channels forming a regularly axially spaced series of annular interstitial rings with cylindrical outer surfaces co extensive to said cylindrical pilot surface, each channel and interstitial ring having a total axial thickness less than said rotating component's annular edge axial thickness, whereby said pilot surface is reduced in total surface area by said cut channels, while said component annular edge can still be concentrically guided axially inwardly over said interstitial annular rings during installation, after which said component annular edge is radially opposed to at least one interstitial ring and one square cross sectioned channel, thereby providing a reduced area contact interface subject to water corrosion and also providing effect water drainage away from said contact interface with substantially no capillary action to draw water into said contact interface.

2. In a corrosive material automotive wheel bearing spindle having a center axis of rotation, a cylindrical pilot surface exposed to water in use and concentric to said axis of rotation over which pilot surface is installed a component with an annular inner edge of predetermined axial thickness with a small radial clearance from said pilot surface, the improvement comprising;

a series of substantially annular, regularly axially spaced channels of rectangular cross section cut into said pilot surface, said channels forming a regularly axially spaced series of annular interstitial rings with cylindrical outer surfaces co extensive to said cylindrical pilot surface, each channel and interstitial ring having a total axial thickness approximately equal to half of said rotating component's annular edge axial thickness, whereby said pilot surface is reduced in total surface area by said cut channels, while said component annular edge can still be concentrically guided axially inwardly over said interstitial annular rings during installation, after which said component annular edge is radially opposed to a small number of interstitial rings and bridges at least one square cross sectioned channel, thereby providing a reduced area contact interface subject to water corrosion and also providing effect water drainage away from said contact interface with substantially no capillary action to draw water into said contact interface.

3. In a corrosive material automotive wheel bearing spindle having a center axis of rotation, a cylindrical pilot surface exposed to water in use and concentric to said axis of rotation over which pilot surface is installed a component with an annular inner edge of predetermined axial thickness with a small radial clearance from said pilot surface, the improvement comprising;

a continuous, low lead angle spiral cut into said pilot surface so as to effectively create a series of substantially annular, regularly axially spaced channels of rectangular cross section separated by a regularly axially spaced series of annular interstitial rings with cylindrical outer surfaces co extensive to said cylindrical pilot surface, each channel and interstitial ring having a total axial thickness less than said rotating component's annular edge axial thickness, whereby said pilot surface is reduced in total surface area by said cut channels, while said component annular edge can still be concentrically guided axially inwardly over said interstitial annular rings during installation, after which said component annular edge is radially opposed to at least one interstitial rings and one square cross sectioned channel, thereby providing a reduced area contact interface subject to water corrosion and also providing effective water drainage away from said contact interface with substantially no capillary action to draw water into said contact interface.

\* \* \* \* \*